Sept. 7, 1965   J. D. COLLINS   3,204,717
VEHICLE POWER PLANT AND WHEEL SUSPENSION SYSTEM
Original Filed Nov. 30, 1961   5 Sheets-Sheet 1
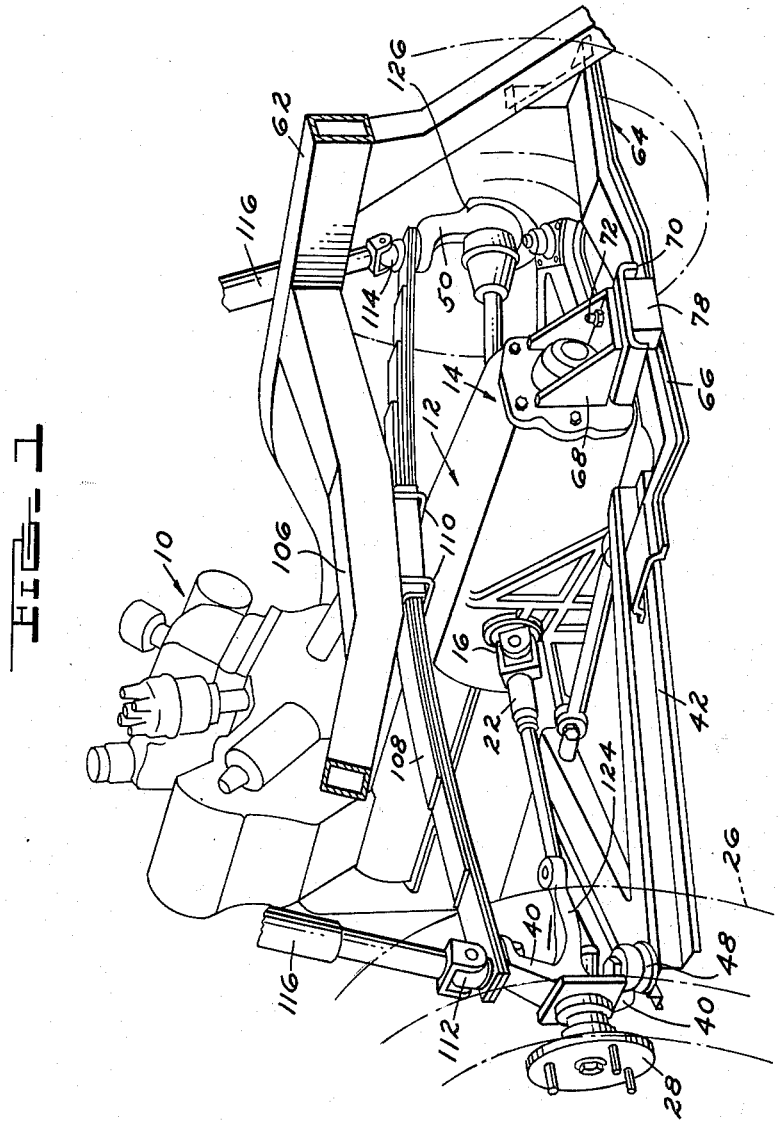
JACK D. COLLINS
INVENTOR.
BY John R. Faulkner
Clifford L. Sadler
ATTORNEYS

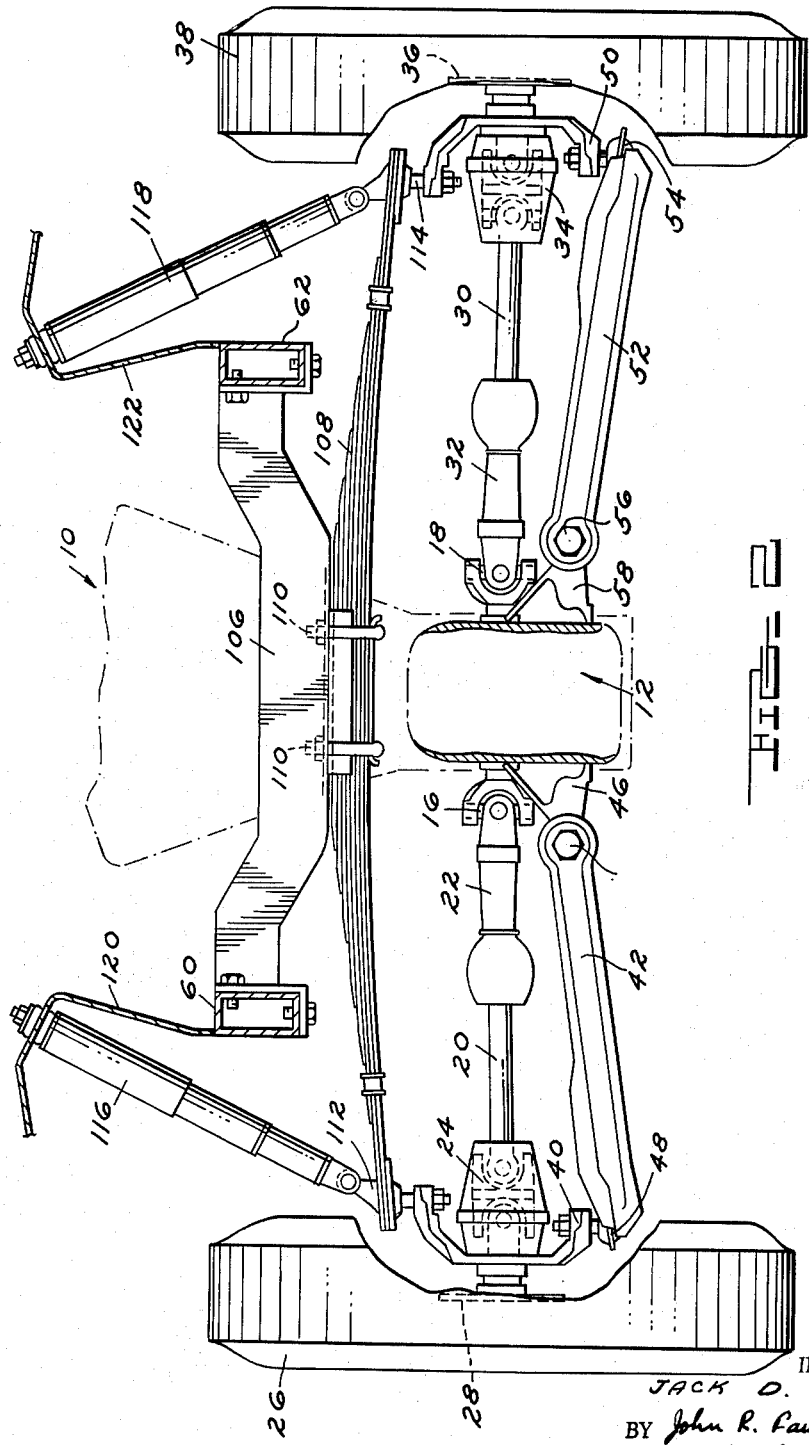

Sept. 7, 1965     J. D. COLLINS     3,204,717
VEHICLE POWER PLANT AND WHEEL SUSPENSION SYSTEM
Original Filed Nov. 30, 1961     5 Sheets-Sheet 3
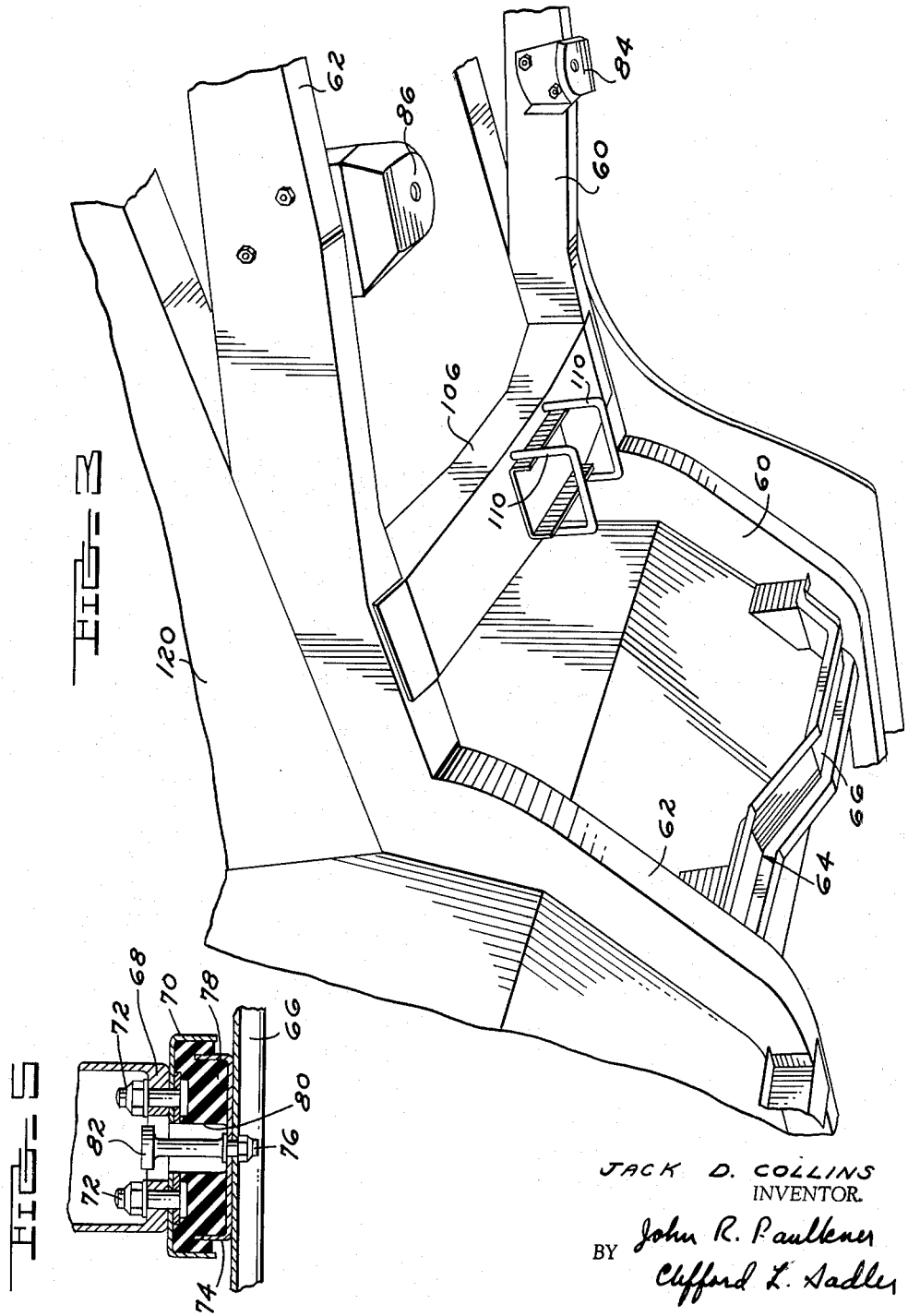
JACK D. COLLINS
INVENTOR.
BY John R. Paulkner
Clifford L. Sadler
ATTORNEYS Sept. 7, 1965   J. D. COLLINS   3,204,717
VEHICLE POWER PLANT AND WHEEL SUSPENSION SYSTEM
Original Filed Nov. 30, 1961   5 Sheets-Sheet 4
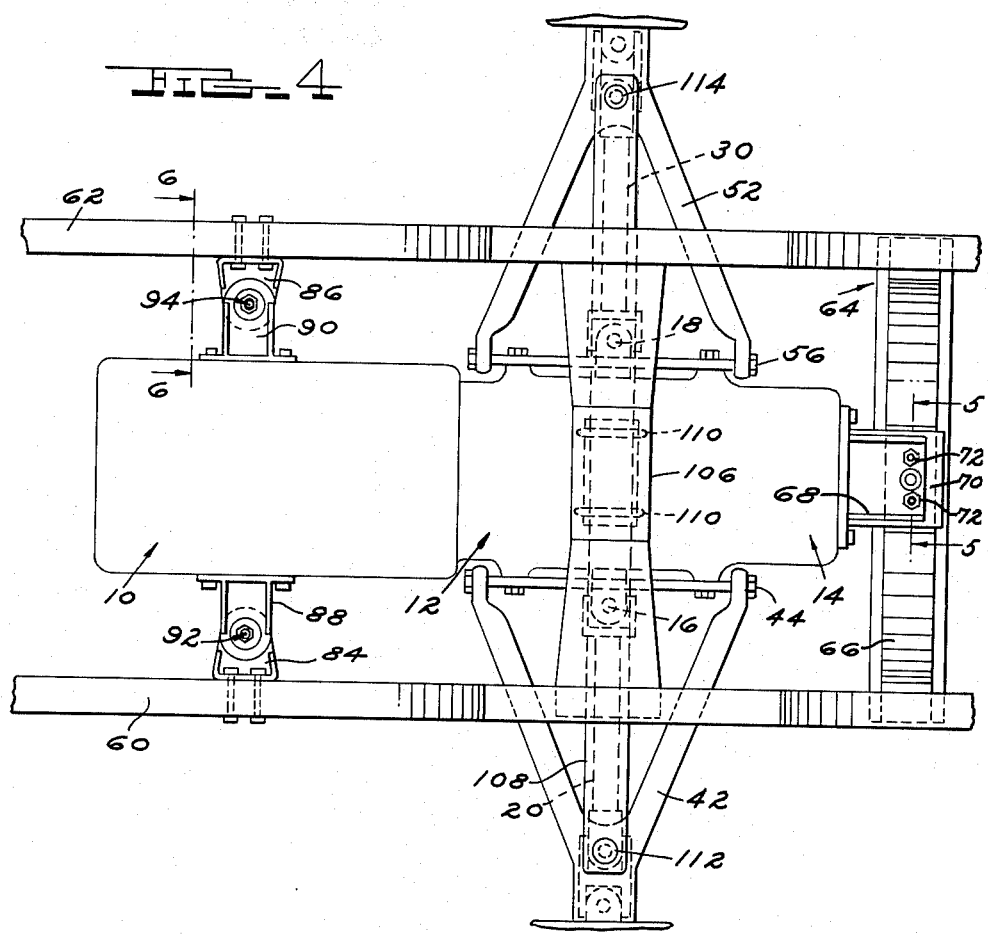
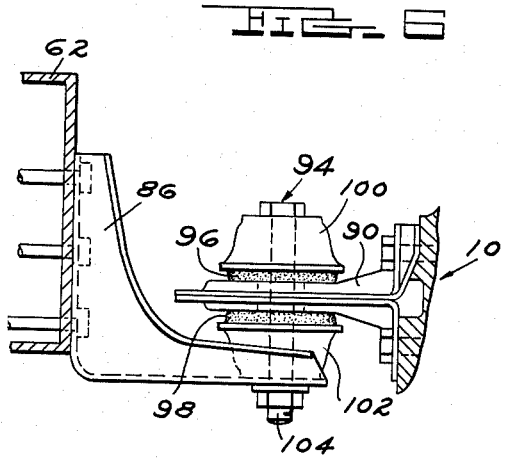
JACK D. COLLINS
INVENTOR.
BY John R. Faulkner
Clifford L. Sadler
ATTORNEYS

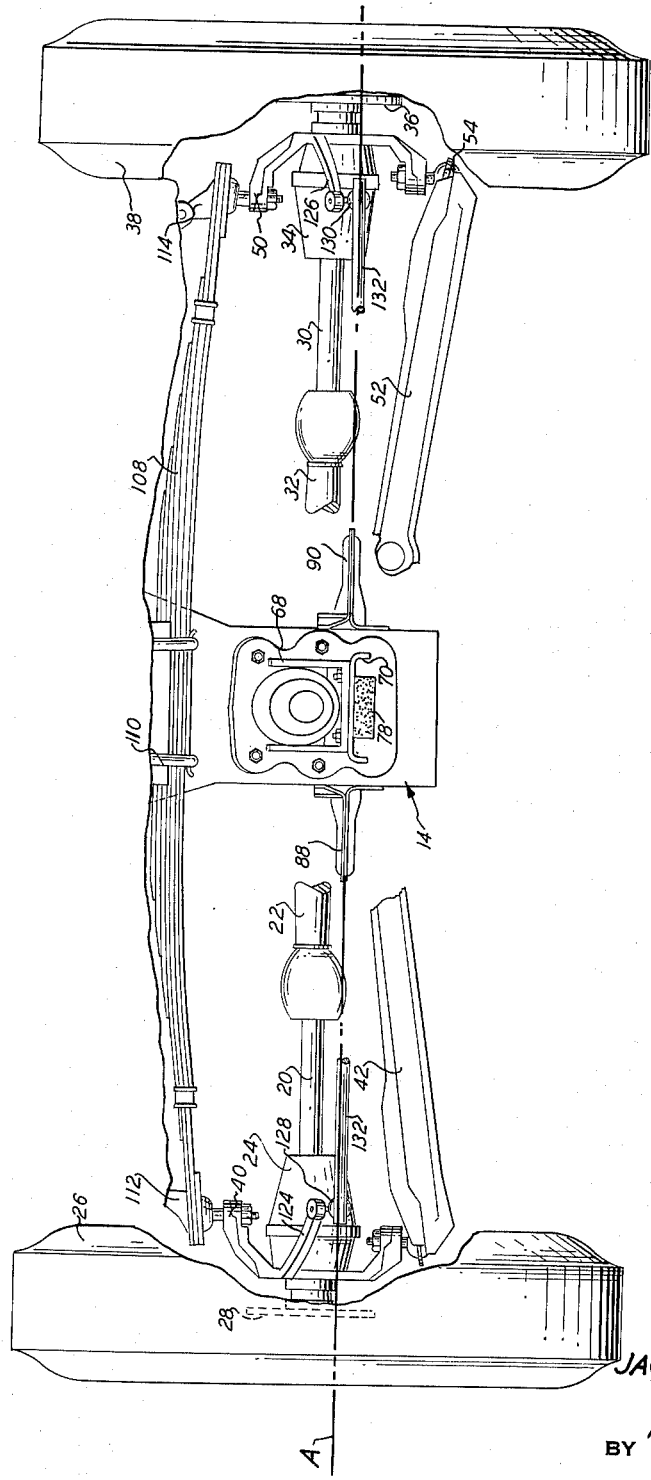

United States Patent Office 3,204,717
Patented Sept. 7, 1965

3,204,717
VEHICLE POWER PLANT AND WHEEL
SUSPENSION SYSTEM
Jack D. Collins, Dearborn, Mich., assignor to Ford Motor
Company, Dearborn, Mich., a corporation of Delaware
Continuation of application Ser. No. 155,907, Nov. 30,
1961. This application July 16, 1964, Ser. No. 384,284
15 Claims. (Cl. 180—42)

The present application is a continuation of application Serial No. 155,907, filed Nov. 30, 1961 (now abandoned) and relates generally to vehicle power plants and suspension systems. More particularly, it relates to an integrated suspension system for a vehicle in which the motor, transmission and final drive are combined in a single package.

In is the principal object of the present invention to provide a unit power plant with an associated suspension system for a vehicle that is characterized by its superior operating and handling features.

More specifically, it is an object of this invention to provide an embodiment having a power package and suspension system for a vehicle in which an engine, differential and transmission are serially situated with half-shafts extending transversely from the differential portion of the power package. Steerable wheels are located at the outer ends of the half-shafts and are supported in part by lower suspension arms that are pivotally connected at their inner ends to the housing for the differential and transmission.

The power unit is intended to be located in the forward end of a vehicle and secured to the frame portion of its body by appropriate resilient mounts. The wheels are resiliently supported and their position controlled by a transversely extending leaf spring that is secured at its center to a cross-frame member and at its outer ends to the wheel supporting spindles.

Thee wheel spindles are supported for vertical movement by the pivotally mounted lower arms and the resilient leaf spring, however, these members are secured to sprung components of the vehicle that are relatively movable. The lower arms are mounted on the engine, differential and transmission unit which in turn is resiliently supported on the frame. The leaf spring, which constitutes the upper suspension control element, is rigidly secured to the frame. Thus, due to the resilient mounts for the unit power plant, relative movement is possible and contemplated between the sprung supports for the upper and lower wheel control members. In accordance with the present invention, the resilient mounts for the power plant permit vertical movement to a limited extent but highly restrict movement in a horizontal plane.

Therefore, it is a more specific object of the present invention to provide an integrated power plant and suspension arrangement having upper and lower suspension control members for the wheels that are secured at their sprung ends to resiliently separated members. Such construction has the advantages of reducing and isolating vibration and harshness.

The objects and advantages of the present invention will be more fully comprehended from the following description and the accompanying drawings, in which:

FIGURE 1 is a rear perspective view of an integrated power plant and suspension system constructed in accordance with the present invention;

FIGURE 2 is a rear elevational view of the construction of FIGURE 1;

FIGURE 3 is a bottom perspective view of the vehicle frame structure to which the power plant is secured;

FIGURE 4 is a top plan view, in schematic form, of the structure of FIGURE 1;

FIGURE 5 is a sectional view taken along section lines 5—5 of FIGURE 4;

FIGURE 6 is a sectional view taken along section lines 6—6 of FIGURE 4; and

FIGURE 7 is a rear elevational view corresponding to FIGURE 2 showing the relationship between the front and rear mounts and the steering arms.

Reference is now made to the drawings wherein the presently preferred embodiment of this invention is disclosed. In FIGURE 1, an internal combustion engine 10 has a differential gear unit 12 and a transmission 14 secured to it to provide an integrated power package. The power output from this package occurs at the differential portion 12 where left and right universal joints 16 and 18 are provided.

A left half-shaft 20 is connected to the universal joint 16 by means of a slip-spline 22. The outer end of the half-shaft 20 is connected to a universal joint 24 which, in turn, is secured to a steerable driving wheel 26 by means of a mounting flange 28.

The drive arrangement at the right-hand side is of similar construction. There, half-shaft 30 is connected to the universal joint 18 by a slip-spline 32. A universal joint 34 is provided at the outer end of half-shaft 30 that carries a mounting flange 36 for a steerable driving wheel 38.

The output of the outer left universal joint 24 connects with the flange 28 and is rotatably supported by a wheel spindle 40. A suspension arm 42 is pivotally mounted at 44 upon a bracket 46 secured to the housing for the differential 14 and transmission 16. The outer end of the arm 42 is secured to the spindle 40 by means of a ball joint 48.

At the right hand side of the structure, a spindle 50 rotatably supports the power shaft for the wheel 38 and is connected to the suspension arm 52 by means of a ball joint 54. The inner end of the right suspension arm 52 is pivotally mounted at 56 upon a bracket 58 secured to the right side of the differential and transmission housing 12, 14.

The power plant package, comprising the engine 10, differential 12 and the transmission 14, is resiliently mounted to the frame of a vehicle. The vehicle frame structure comprises left and right frame side rails 60 and 62. The side rails 60, 62 are interconnected by a cross-frame member 64 that has a lowered midportion 66 upon which the rear end of the housing for the transmission 14 is mounted.

The mounting construction for the transmission end of the unit comprises a U-shaped bracket 68 that is rigidly secured to the end of the power unit (see FIGURES 1, 4 and particularly 5). A channel-shaped sheet metal stamping 70 is secured to the mounting bracket 68 by means of bolts 72. The side flanges of the channel piece 70 extend downwardly.

A second channel-shaped piece 74 is secured to the cross-frame member 66 by a bolt 76. The side flanges of the second channel piece 74 extend upwardly and are situated within and spaced from the side flanges of the first channel piece 70.

A rubber element 78 is interposed between the channel members 70 and 74 and their side flanges. A center opening 80 is provided in the rubber element for clearance about an extending portion 82 of the bolt 76. The unusual configuration of the bolt 76 and its extension 82, as seen in FIGURE 5, is employed as a safety feature. In the event of failure of the rubber element 78, the extension 82 will provide a positive mechanical connection between the bracket 68 of the transmission housing and the frame cross-member 66.

In FIGURE 5, the rubber element 78 has substantial vertical thickness to permit a reasonable amount of vertical displacement of the attaching channel members 70 and 74, however, the rubber layer between the side flanges of the channel members 70 and 74 is relatively thin. Any side forces tending to cause lateral deflection of the members will be quickly restricted by a rapid buildup of compression stresses in the thin layer of rubber between the flange. Therefore, the resilient mount disclosed in FIGURE 5 permits a considerably greater deflection in a vertical direction than in a horizontal direction.

At the forward ends of the frame side rails 60 and 62, a pair of mounting brackets 84 and 86 extend inwardly. A complementary pair of mounting brackets 88 and 90 extend outwardly from the engine 10. Frame bracket 84 and engine bracket 88 are connected by a resilient device 92 and in a similar fashion, brackets 86 and 90 are connected by a resilient assembly 94.

The construction of the right forward engine mount 94 is best seen in FIGURE 6. There, a pair of cup-shaped members 96 and 98 receive upper and lower doughnut-shaped rubber pieces 100 and 102. The doughnut-shaped rubber elements 100 and 102 are secured by a bolt 104 that is rigidly affixed to the frame bracket 86.

The resilient engine mounts 92 and 94 are adapted to permit slight vertical movement of the engine 10, however, they highly restrict any tendency toward movement in a horizontal plane.

The three mounts at the frame brackets 66, 84 and 86 constitute the principal supporting connections between the power plant unit 10, 12, 14 and the vehicle body. Each of the mounts at these three locations have the common feature of resiliently supporting the power unit for slight vertical displacement but highly restricting any tendencies toward lateral movement.

A cross-frame member 106 interconnects the side rails 60 and 62 at a point intermediate of the cross-frame member 64 and the forward mounting brackets 84 and 86. A transversely extending leaf spring 108 is secured to the cross-frame member 106 by means of a pair of U-bolts 110. The outer ends of the spring 108 terminate adjacent the upper ends of left and right wheel spindles 40 and 50. A left-hand upper ball joint assembly 112 secures the left outer end of spring 108 with the wheel spindle 40 and the right-hand end of spring 108 is secured to spindle 50 by a ball joint assembly 114.

A pair of left and right telescopic shock absorbers 116 and 118 complete the suspension construction. The left-hand shock absorber 116 is secured by a pivotal connection to the socket portion of the left-hand ball joint 112 at its lower end. The upper end of shock absorber 116 is affixed to sheet metal body structure 120. Similarly, shock absorber 118 is interposed between a sheet metal panel extending from the side rail 62 and the socket for the left-hand upper ball joint 114.

By securing the lower arms 42 and 52 onto the resiliently mounted power package, vibrations and noise associated with the power plant and drive line are isolated. The transverse spring 108 constitutes the upper control members for the unsprung components and is secured rigidly to the chassis frame for stabilizing purposes. By providing mounts for the engine 10, differential 12 and transmission 14 that permit vertical movement only, essential control is maintained over the path of wheel movement.

The wheel spindles 40 and 50 each have a steering arm 124 and 126 respectively. The ends of the steering arm are connected by means of ball joints 128 and 130 to the steering linkage 132.

The steering linkage 130 is connected to the body and the resilient mounts for the power unit permit relative movement between the linkage 130 and the arms 124, 126. However, the steering ball joints 128, 130 are positioned to lie in the same plane that contains the rear engine mount 68, 70 and the two front mounts 88, 90 and in this manner movement or vibration of the power package does not affect steering. In FIGURE 7, the common plane for the power plant mounts and the steering arm ends is indicated by the line A.

The foregoing description presents the presently preferred embodiment of this invention. The embodiment is characterized by its compact design. The associated suspension and mounting arrangement that provides a stable unit not subject to excessive vibration. Modifications and alterations may occur to those skilled in the art that will come within the scope and spirit of the following claims:

As used in the claims, the term "body" refers to support structure and includes the vehicle frame whether it is integral or separate from the body per se.

I claim:
1. A vehicle having a body, a power delivery unit resiliently connected to said body, a pair of driving wheels positioned laterally of said power unit, shaft means drivingly interconnecting said wheels and said unit, suspension arms interconnecting said power unit and said wheels, wheel positioning means secured to said body at one portion and to said wheels at another portion, said latter means comprising a transverse leaf spring.

2. A vehicle having a body and a power plant, said power plant being secured to said body by a plurality of resilient mounts, said mounts permitting limited vertical movement of said power plant relative to said body, said mounts substantially restricting horizontal movement of said power plant relative to said body, steerable wheels disposed laterally of said power plant, members rotatably supporting said steerable wheels, suspension arms interconnecting said power plant and said members, steering linkage mounted on said body, said members having steering arms extending therefrom for attachment to said steering linkage, the ends of said steering arms lying in the same plane as said power plant mounts.

3. A vehicle having a body and a power plant, said power plant being secured to said body by a plurality of resilient mounts, said mounts permitting limited vertical movement of said power plant relative to said body, said mounts substantially restricting horizontal movement of said unit relative to said body, drive shafts extending laterally from the sides of said power plant, driving wheels connected to the ends of said shafts, suspension arms interconnecting said power plant and said wheels, a transverse leaf spring secured to said body, the outer ends of said leaf spring being secured to said wheels.

4. A vehicle having a body and a power plant unit, said unit comprising an integrated package having an engine, differential and a transmission, said unit being secured to said body by a plurality of mounts, said mounts permitting limited vertical movement of said unit relative to said body, said mounts substantially restricting horizontal movement of said unit relative to said body, drive shafts extending transversely from the sides of said unit, wheels connected to the ends of said shafts, wheel support members rotatably supporting said shafts at their wheel ends, suspension arms interconnecting said unit and said spindles, a transverse leaf spring secured to said body, the outer ends of said leaf spring being pivotally secured to said spindles.

5. A vehicle having a body and a power plant unit, said unit comprising an integrated package having an engine, differential and a transmission, said unit being secured to said body by a plurality of mounts, said mounts permitting limited vertical movement of said unit relative to said body, said mounts substantially restricting horizontal movement of said unit relative to said body, drive shafts extending transversely from the sides of said unit, steerable wheels connected to the ends of said shafts, wheel spindles rotatably supporting said shafts at their wheel ends, suspension arms interconnecting said unit and said spindle, a transverse leaf spring secured to said body, the outer ends of said leaf spring being pivotally secured to said spindles, steering linkage mounted on said body, said spindles having steering arms extending therefrom for attachment to said steering linkage, the ends of said steering arms lying in the same plane as said unit mounts.

6. A vehicle having a body, a power delivery unit resiliently supported by said body, a pair of wheels positioned to the sides of said power unit, suspension arms interconnecting said power unit and said wheels, a nonrigid wheel positioning suspension means secured to said body at one portion and to said wheels at another portion.

7. A vehicle having a body, a power delivery unit resiliently supported by said body, a pair of driving wheels positioned laterally of said power unit, shaft means drivingly interconnecting said wheels and said unit, suspension arms interconnecting said power unit and said wheels, a nonrigid wheel positioning suspension means secured to said body at one portion and to said wheels at another portion.

8. A vehicle having a body, a power unit resiliently supported by said body, a pair of driving wheels positioned laterally of said power unit, shaft means drivingly interconnecting said wheels and said unit, suspension arms interconnecting said power unit and said wheels, a nonrigid wheel positioning suspension means secured to said body at one portion and to said wheels at another portion, said resilient connection between said unit and said body permitting limited vertical movement but substantially restricting relative horizontal movement.

9. A vehicle having a body and a power plant, said power plant being secured to said body by a plurality of resilient mounts, said mounts lying in a generally common plane, steerable wheels disposed laterally of said power plant, said wheels having supports means with steering arms, steering linkage mounted on said body, said steering arms and said steering linkage being connected by joints lying in said common plane.

10. A vehicle having a body and a power plant, said power plant being secured to said body by a plurality of resilient mounts, said mounts lying in a generally common plane, steerable wheels disposed laterally of said power plant, suspension means interconnecting said wheels and said resiliently mounted power plant, said wheels having support means with steering arms, steering linkage mounted on said body, said steering arms and said steering linkage being connected by joints lying in said common plane.

11. A vehicle having a body, a power delivery unit, said power delivery unit being secured to and supported on said body by a plurality of resilient mounts, a pair of wheels disposed laterally of said power delivery unit, support means rotatably supporting said wheels, first and second wheel positioning suspension means connected to said support means and constructed to guide said wheels along a substantially vertical path relative to said body and said power delivery unit during jounce and rebound movement, said first wheel positioning suspension means interconnecting said support means and said power delivery unit, said second wheel positioning suspension means interconnecting said support means and said body.

12. A vehicle having a body, a power delivery unit, said power delivery unit being secured to and supported on said body by a plurality of resilient mounts, a pair of wheels disposed laterally of said power delivery unit, support means rotatably supporting said wheels, first and second wheel positioning suspension means connected to said support means and constructed to guide said wheels along a substantially vertical path relative to said body and said power delivery unit during jounce and rebound movement, said first wheel positioning suspension means interconnecting said support means and said power delivery unit, said second wheel positioning suspension means interconnecting said support means and said body, said plurality of resilient mounts having greater flexibility in a vertical direction than in a lateral direction.

13. A vehicle having a body, a power delivery unit, said power delivery unit being secured to and supported on said body by a plurality of resilient mounts, a pair of driving wheels disposed laterally of said power delivery unit, shaft means drivingly interconnecting said wheels and said power delivery unit, support means rotatably supporting said wheels, first and second wheel positioning suspension means connected to said support means and constructed to guide said wheels along a substantially vertical path relative to said body and said power delivery unit during jounce and rebound movement, said first wheel positioning suspension means interconnecting said support means and said power delivery unit, said second wheel positioning suspension means interconnecting said support means and said body.

14. A vehicle having a body and a power plant, said power plant being secured to said body by a plurality of resilient mounts, said mounts lying in a generally common plane, steerable wheels disposed laterally of said power plant, support means rotatably supporting said wheels, said support means having steering arms, steering linkage mounted on said body, said steering arms and said steering linkage being connected by joints lying in said common plane, first and second wheel positioning suspension means connected to said support means and constructed to guide said wheels along a substantially vertical path relative to said body and said power plant during jounce and rebound movement, said first wheel positioning suspension means interconnecting said support means and said power plant, said second wheel positioning suspension means interconnecting said support means and said body.

15. A vehicle having a body and a power plant, said power plant being secured to said body by a plurality of resilient mounts, said mounts lying in a generally common plane and having a greater flexibility in a vertical direction than in a lateral direction, steerable wheels disposed laterally of said power plant, support means rotatably supporting said wheels, said support means having steering arms, steering linkage mounted on said body, said steering arms and said steering linkage being connected by joints lying in said common plane, first and second wheel positioning suspension means connected to said support means and constructed to guide said wheels along a substantially vertical path relative to said body and said power plant during jounce and rebound movement, said first wheel positioning suspension means interconnecting said support means and said power plant, said second wheel positioning suspension means interconnecting said support means and said body.

References Cited by the Examiner

UNITED STATES PATENTS

| | | | |
|---|---|---|---|
| 1,641,856 | 9/27 | Lloyd et al. | 180—64 X |
| 1,797,578 | 3/31 | Hoffman | 180—43 |
| 1,829,676 | 10/31 | Royce | 180—64 X |
| 2,124,088 | 7/38 | Stout | 267—19 X |
| 2,155,750 | 4/39 | Best. | |
| 2,159,332 | 5/39 | Lee | 280—106.5 X |
| 2,751,992 | 6/56 | Nallinger | 280—106.5 X |
| 3,089,559 | 5/63 | Rieck | 180—64 |
| 910,256 | 4/54 | Germany. | |
| 919,929 | 11/54 | Germany. | |
| 1,078,880 | 3/60 | Germany. | |
| 435,392 | 9/35 | Great Britain. | |

MILTON BUCHLER, *Primary Examiner.*

KENNETH H. BETTS, *Examiner.*